US011277706B2

(12) United States Patent
Milne et al.

(10) Patent No.: US 11,277,706 B2
(45) Date of Patent: Mar. 15, 2022

(54) ANGULAR SENSING FOR OPTIMIZING SPEAKER LISTENING EXPERIENCE

(71) Applicant: Sony Corporation, Tokyo (JP)

(72) Inventors: James R. Milne, Ramona, CA (US); Gregory Carlsson, Santee, CA (US); William Clay, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/893,983

(22) Filed: Jun. 5, 2020

(65) Prior Publication Data

US 2021/0385604 A1 Dec. 9, 2021

(51) Int. Cl.
*H04S 7/00* (2006.01)
*G01C 17/04* (2006.01)
*G01C 19/36* (2006.01)
*H04R 5/02* (2006.01)

(52) U.S. Cl.
CPC .............. *H04S 7/303* (2013.01); *G01C 17/04* (2013.01); *G01C 19/36* (2013.01); *H04R 5/02* (2013.01); *H04S 2400/11* (2013.01)

(58) Field of Classification Search
None
See application file for complete search history.

(56) References Cited

U.S. PATENT DOCUMENTS

| 10,708,706 | B1 * | 7/2020 | Brimijoin, II | G06F 3/013 |
| 2011/0109540 | A1 * | 5/2011 | Milne | G06F 1/1694 345/156 |
| 2012/0075957 | A1 * | 3/2012 | De Bruijn | H04S 7/301 367/118 |
| 2013/0279706 | A1 * | 10/2013 | Marti | G06F 3/165 381/57 |
| 2014/0314239 | A1 * | 10/2014 | Meyer | G06F 3/165 381/58 |
| 2015/0029225 | A1 * | 1/2015 | Aigner | G06F 1/1694 345/650 |
| 2015/0220302 | A1 * | 8/2015 | Kallai | H04R 29/007 700/94 |
| 2016/0316305 | A1 * | 10/2016 | Sheen | G06F 3/165 |
| 2019/0075418 | A1 * | 3/2019 | Shi | H04S 7/303 |
| 2019/0104373 | A1 * | 4/2019 | Wodrich | G06F 3/165 |
| 2019/0356985 | A1 * | 11/2019 | Milne | H04S 7/303 |
| 2020/0213800 | A1 * | 7/2020 | Jot | H04S 7/302 |

\* cited by examiner

*Primary Examiner* — Qin Zhu
(74) *Attorney, Agent, or Firm* — John L. Rogitz

(57) ABSTRACT

Audio speaker angular determination is made using sensor fusion technology involving an accelerometer, gyroscope, and magnetometer (compass). All speakers in an audio system use their magnetometers to determine their orientation relative to magnetic north. A group owner (typically the center channel or sound bar) gathers the orientation information from all speakers in the system. The group owner determines the angle of orientation of all speakers relative to its own orientation. Changes in angular orientation are sensed by the gyroscopes. For example, during calibration, the user can be told to rotate a certain speaker in the system, and the gyroscope measures the change and reports to the group owner. An indication is presented as to whether the new angle is good, or more is required. The gyroscope in combination with the accelerometer senses changes of angular orientation to aim height speakers downward towards the listening position or bottom speakers upward.

19 Claims, 9 Drawing Sheets

SIDE VIEW

ANGULAR SENSING FOR OPTIMIZING SPEAKER LISTENING EXPERIENCE

FIELD

The present application relates generally to networked speaker systems.

BACKGROUND

U.S. Pat. Nos. 9,288,597, 9,560,449, 9,866,986, 9,402,145, 9,369,801, 9,426,551, 9,826,332, 9,924,291, 9,693,169, 9,854,362, 9,924,286, 10,616,684, 10,623,859, and USPP 2018/0115825, owned by the present assignee and all incorporated herein by reference, teach techniques related to audio speaker systems and more particularly to wirelessly networked audio speaker systems. By wirelessly networking speakers in a system, flexibility is enhanced, because users can easily move speakers to locations in buildings as they desire and otherwise configure the audio system setup without the nuisance of wiring.

SUMMARY

As understood herein, for achieving the best acoustics for a given speaker setup, it is important to know not only how many speakers are in the system and where they are located, but also the angular orientation of each speaker. For example, in a stereo pair it is important to know how the speakers are angled relative to the listener in both the horizontal and vertical planes (i.e., the azimuth and elevation angle of the sonic axis of the speaker). Knowing such information allows speaker settings to be optimized. Example speaker settings that can be adjusted according to the angular orientation of speakers in the system ensure proper time arrival to listener. By getting time arrival correct, adjusting overall system parameters will make the system sound better. Such parameters may include "live sound", the amount of ambient noise that is processed relative to the primary demanded audio, extra base audio, equalization (EQ), and volume.

In a first aspect a device includes at least one processor configured with instructions to receive, from at least one orientation sensor on a speaker, at least one signal. The instructions are executable to, based at least in part on the signal, retrieve at least one speaker configuration setting, and establish a first value of at least a first audio setting of the speaker based on the speaker configuration setting.

In example implementations the first audio setting may include one or more of a speaker system channel configuration, a compression setting, ambient sound attenuation, extra bass, equalization (EQ). In example embodiments the at least one orientation sensor includes a magnetometer, an accelerometer, and a gyroscope.

In another aspect, a method includes receiving a signal from at least one sensor on a housing of a speaker representing an angular orientation of the speaker. The method also includes establishing at least one speaker configuration of the speaker based at least in part on the signal.

In non-limiting examples the sensor includes a magnetometer, an accelerometer, and a gyroscope. In some embodiments the method may include presenting a human-perceptible prompt to rotate the housing. The method may also include using a magnetometer to determine an orientation of the housing relative to magnetic north. Further, example implementations of the method may include determining an orientation of the housing relative to a location of a listener, identifying changes in angular orientation of the housing using at least one gyroscope, and fusing a signal from a gyroscope with a signal from an accelerometer to sense changes of angular orientation of the housing.

In another aspect, an audio speaker system includes at least a first audio speaker associated with a first speaker driver and at least one processor configured with instructions for establishing a first audio configuration of the first audio speaker responsive to a first signal from a motion sensor mounted on a surface of a housing of the first audio speaker.

The details of the present application, both as to its structure and operation, can be best understood in reference to the accompanying drawings, in which like reference numerals refer to like parts, and in which:

DETAILED DESCRIPTION

Figure 1:
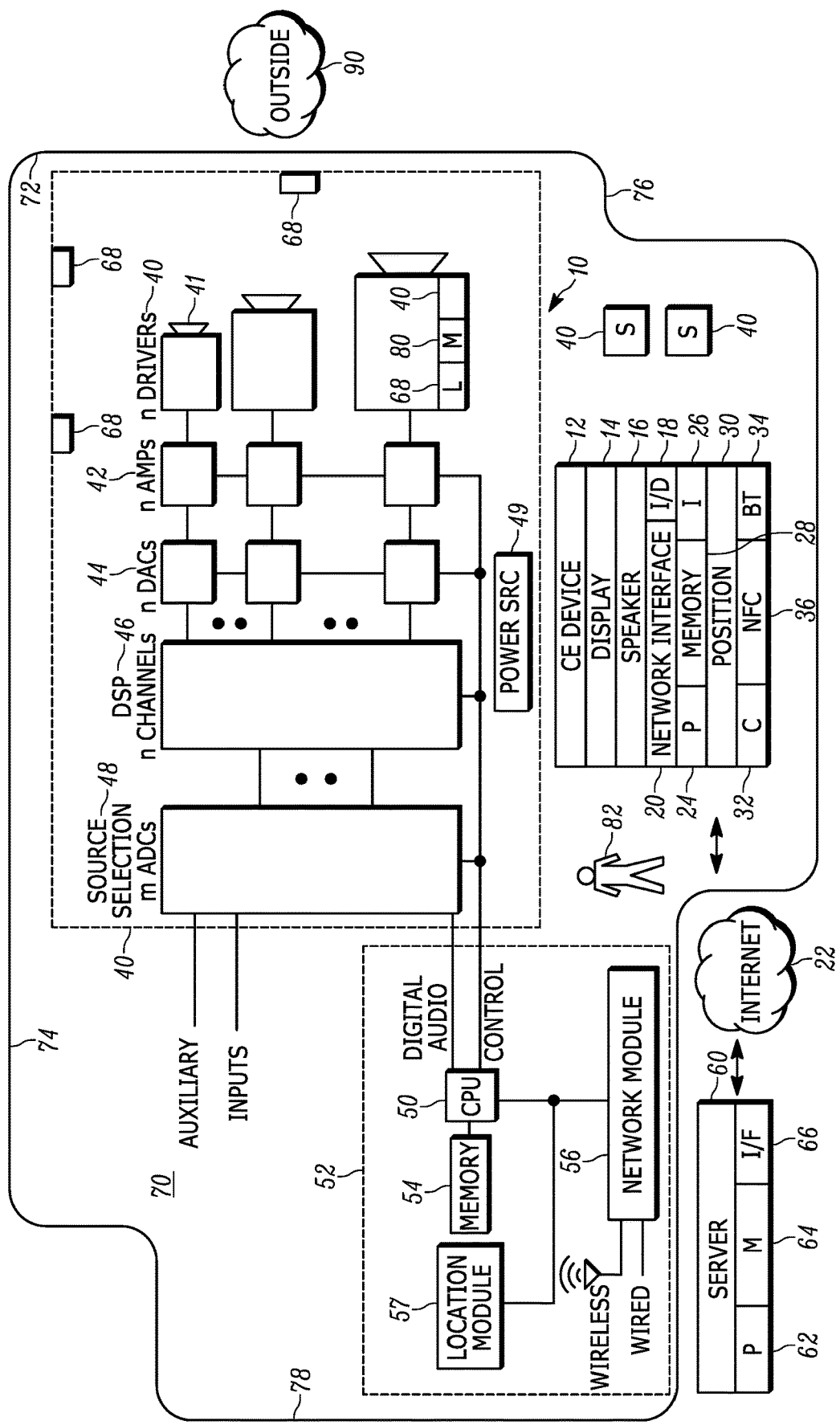
FIG. 1 is a block diagram of an example wireless audio speaker system.

In addition to the instant disclosure, further details may use Decawave's ultra-wide band (UWB) techniques disclosed in one or more of the following location determination documents, all of which are incorporated herein by reference: U.S. Pat. Nos. 9,054,790; 8,870,334; 8,677,224; 8,437,432; 8,436,758; and USPPs 2008/0279307; 2012/0069868; 2012/0120874. In addition to the instant disclosure, further details on aspects of the below-described rendering including up-mixing and down rendering may use the techniques in any one or more of the following rendering documents, all of which are incorporated herein by reference: U.S. Pat. Nos. 7,929,708; 7,853,022; USPP 2007/0297519; USPP 2009/0060204; USPP 2006/0106620; and Reams, "N-Channel Rendering: Workable 3-D Audio for 4 kTV", AES 135 White paper, New York City 2013.

This disclosure relates generally to computer ecosystems including aspects of multiple audio speaker ecosystems. A system herein may include server and client components, connected over a network such that data may be exchanged between the client and server components. The client components may include one or more computing devices that have audio speakers including audio speaker assemblies per se but also including speaker-bearing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google.

These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12. The CE device 12 may be, e.g., a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is configured to undertake present principles (e.g. communicate with other devices to undertake present principles, execute the logic described herein, and perform any other functions and/or operations described herein).

Accordingly, to undertake such principles the CE device 12 can be established by some or all of the components shown in FIG. 1. For example, the CE device 12 can include one or more touch-enabled displays 14, one or more speakers 16 for outputting audio in accordance with present principles, and at least one additional input device 18 such as e.g. an audio receiver/microphone for e.g. entering audible commands to the CE device 12 to control the CE device 12. The example CE device 12 may also include one or more network interfaces 20 for communication over at least one network 22 such as the Internet, an WAN, an LAN, etc. under control of one or more processors 24. It is to be understood that the processor 24 controls the CE device 12 to undertake present principles, including the other elements of the CE device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, Wi-Fi transceiver, etc.

In addition to the foregoing, the CE device 12 may also include one or more input ports 26 such as, e.g., a USB port to physically connect (e.g. using a wired connection) to another CE device and/or a headphone port to connect headphones to the CE device 12 for presentation of audio from the CE device 12 to a user through the headphones. The CE device 12 may further include one or more computer memories 28 such as disk-based or solid-state storage that are not transitory signals. Also, in some embodiments, the CE device 12 can include a position or location receiver such as but not limited to a GPS receiver and/or altimeter 30 that is configured to e.g. receive geographic position information from at least one satellite and provide the information to the processor 24 and/or determine an altitude at which the CE device 12 is disposed in conjunction with the processor 24.

However, it is to be understood that that another suitable position receiver other than a GPS receiver and/or altimeter may be used in accordance with present principles to e.g. determine the location of the CE device 12 in e.g. all three dimensions.

Continuing the description of the CE device 12, in some embodiments the CE device 12 may include one or more cameras 32 that may be, e.g., a thermal imaging camera, a digital camera such as a webcam, and/or a camera integrated into the CE device 12 and controllable by the processor 24 to gather pictures/images and/or video in accordance with present principles. Also included on the CE device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the CE device 12 may include one or more motion sensors (e.g., an accelerometer, gyroscope, cyclometer, magnetic sensor, infrared (IR) motion sensors such as passive IR sensors, an optical sensor, a speed and/or cadence sensor, a gesture sensor (e.g. for sensing gesture command), etc.) providing input to the processor 24. The CE device 12 may include still other sensors such as e.g. one or more climate sensors (e.g. barometers, humidity sensors, wind sensors, light sensors, temperature sensors, etc.) and/or one or more biometric sensors providing input to the processor 24. In addition to the foregoing, it is noted that in some embodiments the CE device 12 may also include a kinetic energy harvester to e.g. charge a battery (not shown) powering the CE device 12.

In some examples, the CE device 12 may function in connection with the below-described "master" or the CE device 12 itself may establish a "master". A "master" is used to control multiple ("n", wherein "n" is an integer greater than one) speakers 40 in respective speaker housings, each of can have multiple drivers 41, with each driver 41 receiving signals from a respective amplifier 42 over wired and/or wireless links to transduce the signal into sound (the details of only a single speaker shown in FIG. 1, it being understood that the other speakers 40 may be similarly constructed). Each amplifier 42 may receive over wired and/or wireless links an analog signal that has been converted from a digital signal by a respective standalone or integral (with the amplifier) digital to analog converter (DAC) 44. The DACs 44 may receive, over respective wired and/or wireless channels, digital signals from a digital signal processor (DSP) 46 or other processing circuit.

The DSP 46 may receive source selection signals over wired and/or wireless links from plural analog to digital converters (ADC) 48, which may in turn receive appropriate auxiliary signals and, from a control processor 50 of a master control device 52, digital audio signals over wired and/or wireless links. The control processor 50 may access a computer memory 54 such as any of those described above and may also access a network module 56 to permit wired and/or wireless communication with, e.g., the Internet. The control processor 50 may also access a location module 57. The location module 57 may be implemented by a UWB module made by Decawave or it may be implemented using the Li-Fi principles discussed in one or more of the above-referenced patents or by other appropriate techniques including GPS. One or more of the speakers 40 may also have respective location modules attached or otherwise associated with them. As an example, the master device 52 may be implemented by an audio video (AV) receiver or by a digital pre-amp processor (pre-pro).

As shown in FIG. 1, the control processor 50 may also communicate with each of the ADCs 48, DSP 46, DACs 44, and amplifiers 42 over wired and/or wireless links. In any case, each speaker 40 can be separately addressed over a network from the other speakers.

More particularly, in some embodiments, each speaker 40 may be associated with a respective network address such as but not limited to a respective media access control (MAC) address. Thus, each speaker may be separately addressed over a network such as the Internet. Wired and/or wireless communication links may be established between the speakers 40/CPU 50, CE device 12, and server 60, with the CE device 12 and/or server 60 being thus able to address individual speakers, in some examples through the CPU 50 and/or through the DSP 46 and/or through individual processing units associated with each individual speaker 40, as may be mounted integrally in the same housing as each individual speaker 40.

The CE device 12 and/or control device 52 of each individual speaker train (speaker+amplifier+DAC+DSP, for instance) may communicate over wired and/or wireless links with the Internet 22 and through the Internet 22 with one or more network servers 60. Only a single server 60 is shown in FIG. 1. A server 60 may include at least one processor 62, at least one tangible computer readable storage medium 64 such as disk-based or solid-state storage, and at least one network interface 66 that, under control of the processor 62, allows for communication with the other devices of FIG. 1 over the network 22, and indeed may facilitate communication between servers and client devices in accordance with present principles. Note that the network interface 66 may be, e.g., a wired or wireless modem or router, Wi-Fi transceiver, Li-Fi transceiver, or other appropriate interface such as, e.g., a wireless telephony transceiver.

Accordingly, in some embodiments the server 60 may be an Internet server, may include and perform "cloud" functions such that the devices of the system 10 may access a "cloud" environment via the server 60 in example embodiments. In a specific example, the server 60 downloads a software application to the master and/or the CE device 12 for control of the speakers 40 according to logic below. The master/CE device 12 in turn can receive certain information from the speakers 40, such as their location from a real time location system (RTLS) such as but not limited to GPS or Li-Fi or UWB or other technique, and/or the master/CE device 12 can receive input from the user, e.g., indicating the locations of the speakers 40 as further disclosed below. Based on these inputs at least in part, the master/CE device 12 may execute the speaker optimization logic discussed below, or it may upload the inputs to a cloud server 60 for processing of the optimization algorithms and return of optimization outputs to the CE device 12 for presentation thereof on the CE device 12, and/or the cloud server 60 may establish speaker configurations automatically by directly communicating with the speakers 40 via their respective addresses, in some cases through the CE device 12. Note that if desired, each speaker 40 may include one or more respective one or more light emitting diode (LED) assemblies 68 implementing Li-Fi communication to establish short-range wireless communication among the networked speakers shown. Also, the remote control of the user, e.g., the CE device 12, may include one or more LED assemblies.

As shown, the speakers 40 are disposed in the enclosure 70 such as a room, e.g., a living room. For purposes of disclosure, the enclosure 70 has (with respect to the example orientation of the speakers shown in FIG. 1) a front wall 72, left and right-side walls 74, 76, and a rear wall 78. One or more listeners 82 may occupy the enclosure 70 to listen to audio from the speakers 40. One or microphones 80 may be arranged in the enclosure for generating signals representative of sound in the enclosure 70, sending those signals via wired and/or wireless links to the CPU 50 and/or the CE device 12 and/or the server 60. In the non-limiting example shown, each speaker 40 supports a microphone 80, it being understood that the one or more microphones may be arranged elsewhere in the system if desired.

Because of the portability afforded by wireless configurations, one or more components of the system shown in FIG. 1, such as one or more speakers, may be moved outside the enclosure 70 an outside location 90, such as a patio.

Disclosure below may make determinations using sonic wave calculations known in the art, in which the acoustic waves frequencies (and their harmonics) from each speaker, given its role as a bass speaker, a treble speaker, a subwoofer speaker, or other speaker characterized by having assigned to it a particular frequency band and given its location, azimuth, and bearing relative to a reference, are computationally modeled in the enclosure 70 and the locations of constructive and destructive wave interference determined based on where the speaker is and where the walls 72-78 are. As mentioned above, the computations may be executed, e.g., by the CE device 12 and/or by the cloud server 60 and/or master 52.

As an example, a speaker may emit a band of frequencies between 20 Hz and 30 Hz, and frequencies (with their harmonics) of 20 Hz, 25 Hz, and 30 Hz may be modeled to propagate in the enclosure 70 with constructive and destructive interference locations noted and recorded. The wave interference patterns of other speakers based on the modeled expected frequency assignations and the locations in the enclosure 70 of those other speakers may be similarly computationally modeled together to render an acoustic model for a particular speaker system physical layout in the enclosure 70 with a particular speaker frequency assignation. In some embodiments, reflection of sound waves from one or more of the walls may be accounted for in determining wave interference. In other embodiments reflection of sound waves from one or more of the walls may not be accounted for in determining wave interference. The acoustic model based on wave interference computations may furthermore account for particular speaker parameters such as but not limited to equalization (EQ). The parameters may also include delays, i.e., soundtrack delays between speakers, which result in respective wave propagation delays relative to the waves from other speakers, which delays may also be accounted for in the modeling. A soundtrack delay refers to the temporal delay between emitting, using respective speakers, parallel parts of the same soundtrack, which temporally shifts the waveform pattern of the corresponding speaker. The parameters can also include volume, which defines the amplitude of the waves from a particular speaker and thus the magnitude of constructive and destructive interferences in the waveform. Collectively, a combination of speaker location, frequency assignment, and parameters may be considered to be a "configuration". A configuration may be established to optimize, according to a desired, potentially empirically-determined standard of optimization, acoustic wave constructive and destructive interference for a particular location in the enclosure 70 given the locations of the walls and the various frequencies to be assigned to the various speakers. The particular location(s) may be the expected or actual location of one or more listener, and the EQs, frequency assignments, and delays of the various speakers may be further tailored to the desires or traits of specific individual listeners based on listener profiles.

Figure 2:
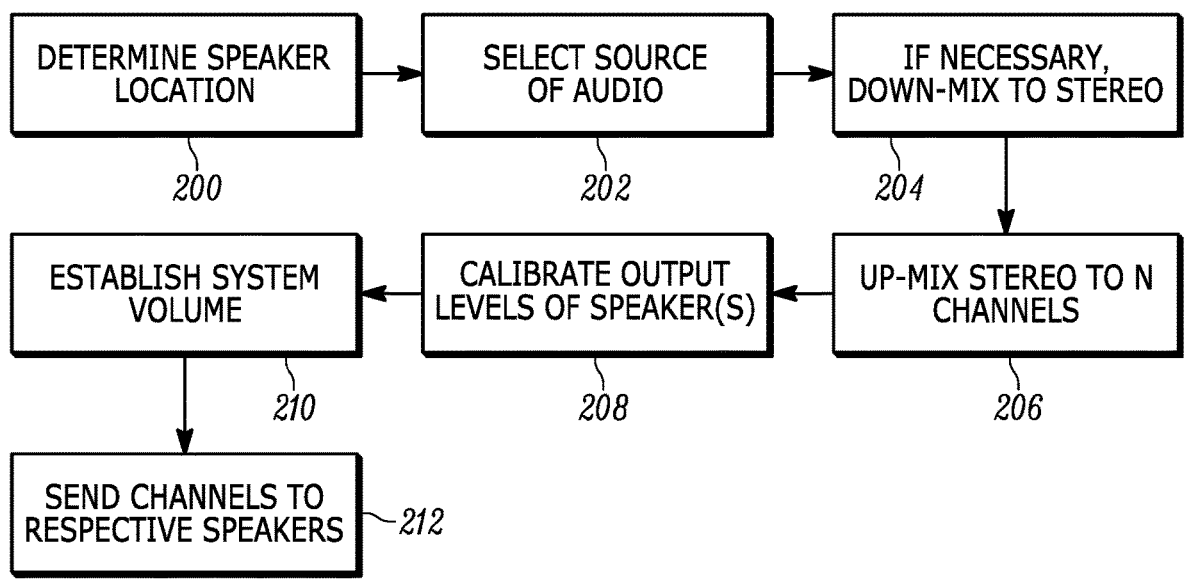
FIG. 2 is a flow chart of example overall logic pertaining to the centralized system in FIG. 1.

The configuration shown in FIG. 1 has a centralized control architecture in which the master device 52 or CE device 12 or other device functioning as a master renders two channel audio into as many channels are there are speakers in the system, providing each respective speaker with its channel. The rendering, which produces more channels than stereo and hence may be considered "up-mixing", may be executed using principles described in the above-referenced rendering references. FIG. 2 describes the overall logic flow that may be implemented using the centralized architecture of FIG. 1, in which most if not all of the logic is executed by the master device.

The logic shown in FIG. 2 may be executed by one or more of the CPU 50, the CE device 12 processor 24, and the server 60 processor 62. The logic may be executed at application boot time when a user, e.g. by means of the CE device 12, launches a control application, which prompts the user to energize the speaker system to energize the speakers 40.

Commencing at block 200, the processor(s) of the master determines room dimension, the location of each speaker in the system, and number of speakers in the room, the azimuth and elevation able of the sonic axis of each speaker (as detailed further in FIG. 8), and the location and if desired identities of each listener in the room. This process is described further below. Moving to block 202, the master selects the source of audio to be played. This may be done responsive to user command input using, e.g., the device 12.

If the input audio is not two channel stereos, but instead is, e.g., seven channel audios plus a subwoofer channel (denoted "7.1 audio"), at block 204 the input audio may be downmixed to stereo (two channel). The down-mixing may be executed using principles described in the above-referenced rendering references. Other standards for down-mixing may be used, e.g., ITU-R BS.775-3 or Recommendation 7785. Then, proceeding to block 206 the stereo audio (whether received in stereo or down-mixed) can be up-mixed to render "N" channels, where "N" is the number of speaker drivers in the system. Audio can be rendered for each speaker driver based on the respective speaker location (i.e., perimeter, aerial, sub in the x, y, z domain). The up-mixing can be based on the current speaker locations as will be explained further shortly.

Moving to block 208, the channel/speaker output levels are calibrated per description below, preferably based on primary listener location, and then at block 210 system volume is established based on, e.g., room dimensions, number and location of speakers, orientation of speakers, etc. The user may adjust this volume. At block 212 the master sends the respective audio channels to the respective speakers.

Thus, it may now be appreciated that the speakers 40 do not have to be in a predefined configuration to support a specific audio configuration such as 5.1 or 7.1 and do not have to be disposed in the pre-defined locations of such audio configurations, because the input audio is down-mixed to stereo and then up-mixed into the appropriate number of channels for the actual locations and number of speakers.

Figure 3:
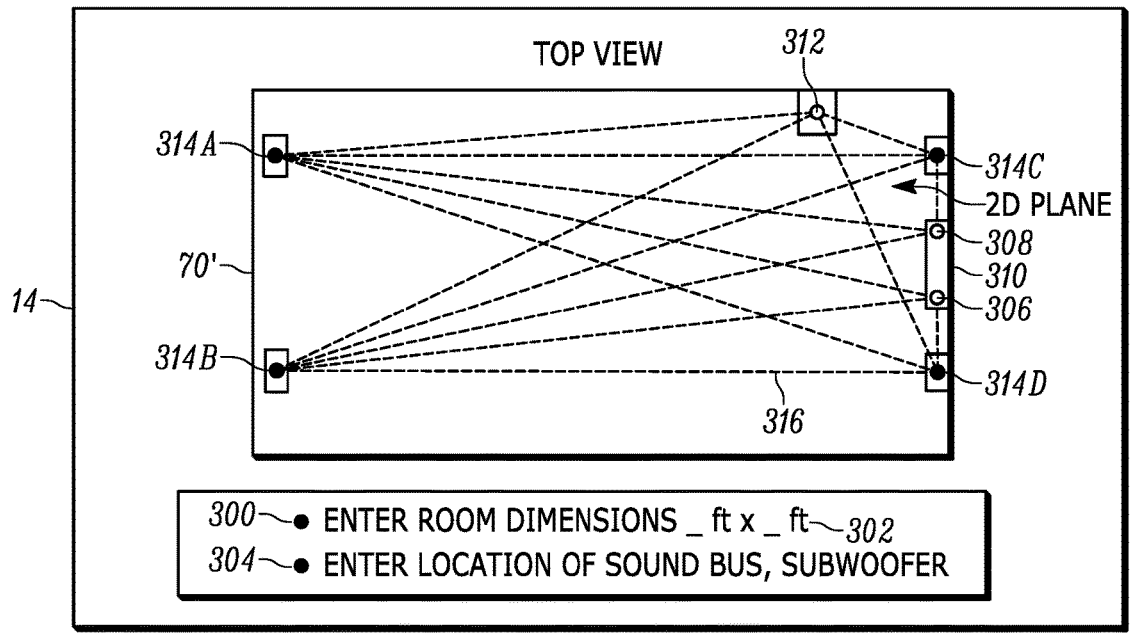
FIG. 3 is a screen shot of an example user interface (UI) that may be presented on a consumer electronics (CE) device to set up speaker location determination.

FIG. 3 illustrates an embodiment in which the dimensions of the enclosure 70 are manually entered by the user, it being understood that automatic means of effecting the same outcome are set forth further below.

Figure 4:
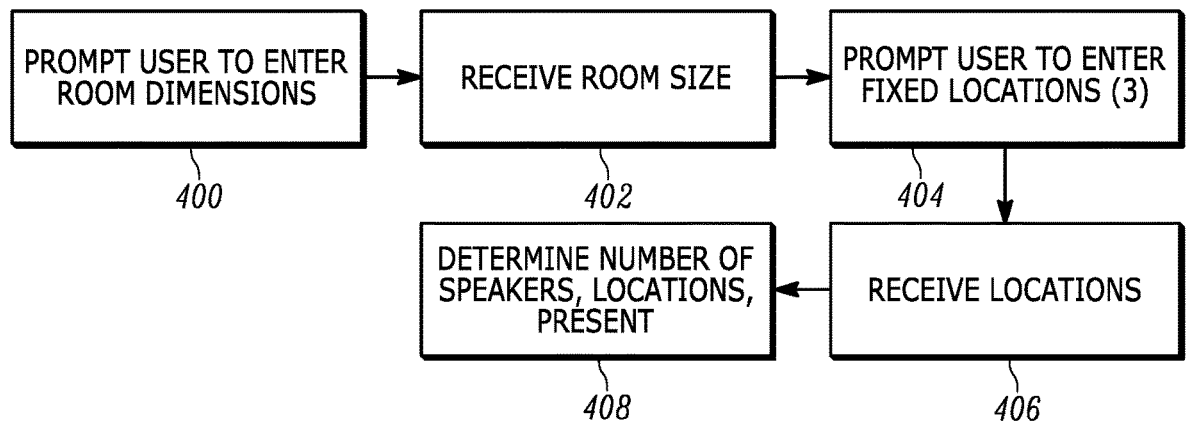
FIG. 4 is a flow chart of example logic for determining speaker locations in a room.

A user interface (UI) may be presented, e.g., on the display 14 of the CE device 12, pursuant to the logic in block 200 of FIG. 2, in the case in which speaker location determination is intended for two dimensions only (in the x-y, or horizontal, plane). FIG. 4 illustrates aspects of logic that may be used with FIG. 3. An application (e.g., via Android, iOS, or URL) can be provided to the customer for use on the CE device 12.

As shown at 300 in FIG. 3 and at block 400 in FIG. 4, the user can be prompted to enter the dimensions of the room 70, an outline 70' of which may be presented on the CE device as shown once the user has entered the dimensions. The dimensions may be entered alpha-numerically, e.g., "15 feet by 20 feet" as at 302 in FIG. 3 and/or by dragging and dropping the lines of an initial outline 70' to conform to the size and shape of the room 70. The application presenting the UI of FIG. 3 may provide a reference origin, e.g., the southwest corner of the room. The room size is received from the user input at block 402 of FIG. 4.

In other embodiments discussed further below, room size and shape can be determined automatically. This can be done by sending measurement waves (such as Li-Fi transmissions from the LEDs) from an appropriate transceiver on the CE device 12 and detecting returned reflections from the walls of the room 70, determining the distances between transmitted and received waves to be one half the time between transmission and reception times the speed of the relevant wave. Or, it may be executed using other principles such as imaging the walls and then using image recognition principles to convert the images into an electronic map of the room.

Moving to block 404, the user may be prompted as at 304 to enter onto the UI of FIG. 3 at least three fixed locations, in one example, the left and right ends 306, 308 of a sound bar or TV 310 and the location at which the user has disposed the audio system subwoofer 312. Four fixed locations are entered for 3D rendering determinations. Entry may be effected by touching the display 14 at the locations in the outline 70' corresponding to the requested components. In a Li-Fi implementation, each fixed location may be associated with a respective Li-Fi LED 68 shown in FIG. 1. The locations are received at block 406 in FIG. 4. The user may also directly input the fact that, for instance, the sound bar is against a wall, so that rendering calculations can ignore mathematically possible calculations in the region behind the wall.

Note that only speakers determined to be in the same room may be considered. Other speakers in other rooms can be ignored. When determining the speaker locations, it may first be decided if a 2D or 3D approach is to be used. This may be done by knowing how many known of fixed locations have been entered. Three known locations yield a 2D approach (all speakers are more or less residing in a single plane). Four known locations yield a 3D approach. Note further that the distance between the two fixed sound bar (or TV) locations may be known by the manufacturer and input to the processor automatically as soon as the user indicated a single location for the sound bar. In some embodiments, the subwoofer location can be input by the user by entering the distance from the sound bar to the subwoofer. Moreover, if a TV is used for two of the fixed locations, the TV may have two locators mounted on it with a predetermined distance between the locators stored in memory, similar to the sound bar. Yet again, standalone location markers such as LEDs or UWB tags can be placed within the room (e.g., at the corner of room, room boundary, and/or listening position) and the distance from each standalone marker to the master entered into the processor.

When communication is established among the speakers in the room 70, at block 408 in FIG. 4 the master device and/or CE device 12 and/or other device implements a location module according to the location determination references above, determining the number of speakers in the room 70 and their locations and orientations, and if desired presenting the speakers at the determined locations (along with the sound bar 310 and subwoofer 213) as shown at 314A-D in FIG. 3. The lines 316 shown in FIG. 3 illustrate communication among the speakers 310, 312, 314 and may or may not be presented in the UI of FIG. 3.

In an example "automatic" implementation, a component in the system such as the master device or CE device 12 originates two-way UWB or Li-Fi ranging (or using GPS modules on each speaker). When ranging is used, range and direction to each speaker from the originating device are determined using triangulation and the distance-time-speed algorithm described above. If desired, multiple rounds of two-way ranging can be performed with the results averaged for greater accuracy.

The two-way ranging described above may be affected by causing the CE device 12 (or other device acting as a master for purposes of speaker location determination) to receive a poll message from an anchor point. The CE device 12 sends a response message to the poll message. These messages can convey the identifications associated with each transmitter. In this way, the number of speakers can be known.

The polling anchor point may wait a predetermined period known to the CE device 12 and then send a final poll message to the CE device 12, which can then, knowing the predetermined period from receipt of its response message that the anchor point waited and the speed of the signals, and the time the final message was received, determine the range to the anchor point.

While FIGS. 3 and 4 are directed to finding the locations of the speakers in two dimensions, their heights (elevations) and elevation angles in the room 70 may also be determined for a three-dimensional location output. The height of each speaker can be manually input by the user or determined using an altimeter associated with each speaker or determined by implementing a LED 68, e.g., the CE device 12 as three integrated circuits with respective LEDs distanced from each other by known distances, enabling triangulation in three dimensions. Other techniques for finding z-axis locations such as UWB, etc. may be used. The elevation angles of the sonic axes of the speakers can be determined using principles discussed below in relation to FIG. 8.

The primary listener location may be then determined according to discussion below. The number of speakers and their locations in the room are now known. Any speakers detected as above that lie outside the room may be ignored. A GUI may be presented on the CE device of the user showing the room and speakers therein and prompting the user to confirm the correctness of the determined locations and room dimensions.

Figure 5:
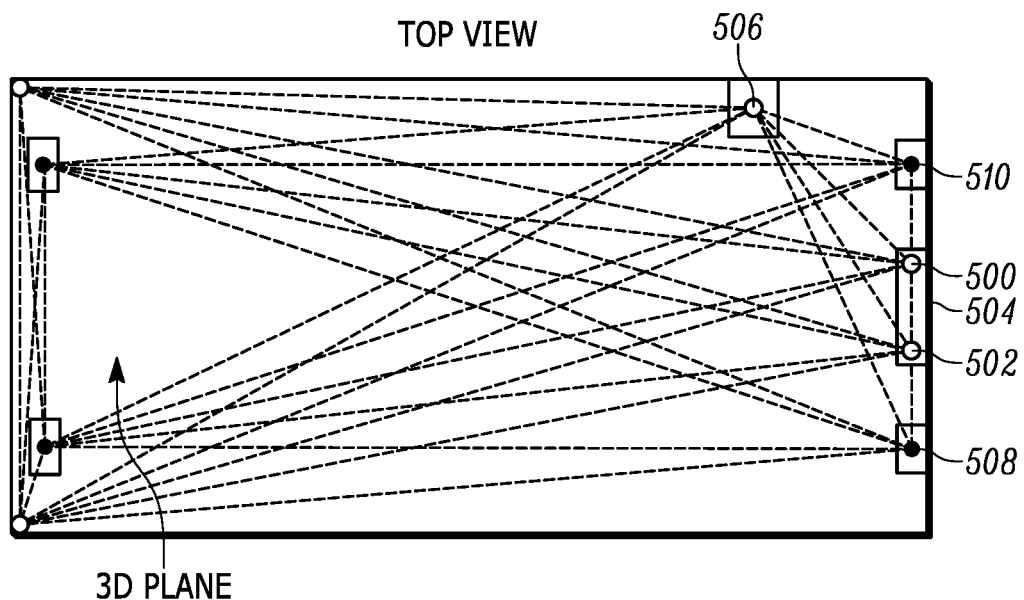
FIGS. 5-7 are additional screen shots of example UIs related to speaker location determination.
Figure 6:
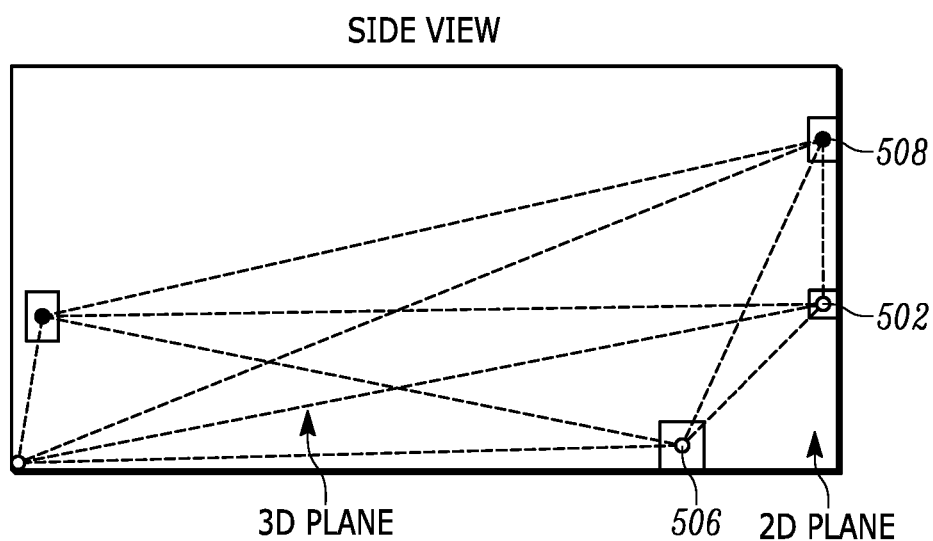

FIGS. 5 and 6 illustrate aspects of an implementation of the 3D location determination. These figures may be presented as UIs on the CE device 12. Four known locations may be provided to determine the location of each speaker in three dimensions. In the example shown in FIG. 5, the user has input the locations 500, 502 associated with a sound bar/TV 504 and the location of the subwoofer 506. The user has also identified (e.g., by touching the display 14 of the CE device 12 at the appropriate locations) two corners 508, 510 of the room 70, preferably corners in which locators such as LEDs 68 have been positioned. Determination of the number of speakers and locations in 3D using triangulation discussed above and the techniques described in the above-referenced location determination references is then made.

Note that while FIGS. 5 and 6 respectively show a top view and a side view of the room 70 on the display 14 in two separate images, a single 3D image composite may be presented.

Figure 7:
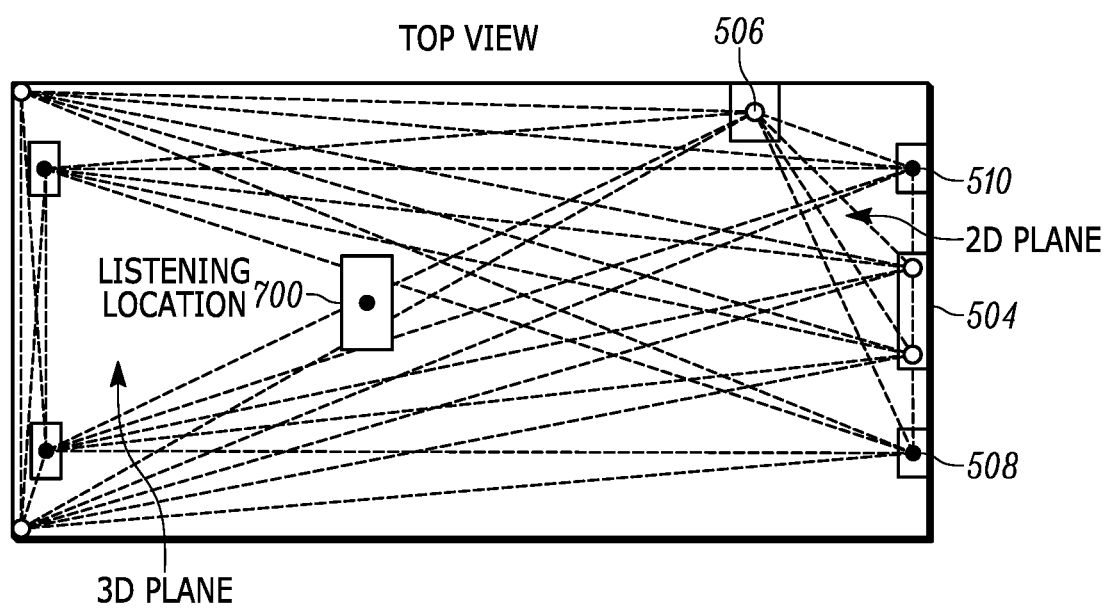

FIG. 7 illustrates yet another UI that can be presented on the CE device 12 in which the user has entered, at 700, the expected location of a listener in the room 700. Or, the location 700 can be automatically determined as described further below using transmissions. Yet again, for purposes of up-mixing according to the rendering references incorporated above, a default location may be assumed, e.g., the geometric center of the room 70, or alternatively about ⅔ of the distance from the front of the room (where the sound bar or TV is usually located) to the rear of the room.

Once the number, orientations, and locations of the speakers are known, the up mixing at block 206 may be executed using the principles discussed in the above-referenced rendering documents. Specifically, the stereo audio (either as received stereo or resulting from down-mixing of non-stereo input audio at block 204) is up-mixed to, as an example, N.M audio, wherein M=number of subwoofers (typically one) and N=number of speaker drivers other than the sub-woofer. As detailed in the rendering documents, the up-mixing uses the speaker locations in the room 70 to determine which of the "N" channels to assign to each of the respective N speaker drivers, with the subwoofer channel being always assigned to the subwoofer. The listener location 700 shown in FIG. 7 can be used to further refine channel delay, EQ, and volume based on the speaker characteristics (parameters) to optimize the sound for the listener location.

One or more measurement microphones, such as may be established by the microphones 80 in FIG. 1, may be used if available to further calibrate the channel characteristics. This may be made based on information received from the individual speakers/CPU 50 indicating microphones are on the speakers, for example.

If measurement microphones are available, the user can be guided through a measurement routine. In one example, the user is guided to cause each individual speaker in the system to emit a test sound ("chirp") that the microphones 80 and/or microphone 18 of the CE device 12 detect and provide representative signals thereof to the processor or processors executing the logic, which, based on the test chirps, can adjust speaker parameters such as EQ, delays, and volume.

The example above uses a centralized master device to up-mix and render each of the "N" audio channels, sending those channels to the respective speakers. When wireless connections are used, and bandwidth is limited, a distributed architecture may be used, in which the same stereo audio from a master is sent to each speaker, and each speaker renders, from the stereo audio, its own respective channel. Details of this alternative architecture are set forth in the above-referenced U.S. Pat. No. 9,826,332.

In determining distances using ranging, one or more measurement signals such as light beams may be transmitted, and reflections received. To determine distance the following equation may be used:

$$D = c(t_1 - t_0)$$

where c=speed of light, $t_1$ is time of receipt, and $t_0$ is time of transmission.

It may then be assumed that for each receiver, the distance to the wall closest to that receiver a midpoint of a projected planar surface. The midpoints may be communicated to a determination processor (which may be implemented by any of the processors herein) which projects respective planes from each midpoint. The projected planar surfaces will intersect each other with the intersections defining the corners of the enclosure 70 and the portions of the projected planes within the corners defining the walls of the enclosure.

The above is but one simplified method for mapping the wall locations of the enclosure 70. More complex methods may be used. For example, the process above can be repeated multiple times to refine the wall locations. Additional reflections after time $t_1$ at each receiver may also be used to ascertain whether a receiver's initial reflection is indeed from a wall or from an intervening object. Or, the transmitting assembly may be mounted on a gimbal to send multiple transmissions at multiple orientations such that the reflections detected by the receivers at some orientations may be received sooner than reflections received at other orientations, with the further reflection being assumed to be a wall and the earlier reflection assumed to be from an intervening object between the receiver and wall. Instead of a gimbal to steer the transmitting assembly, a micro-electrical mechanical system (MEMS) may be used.

Yet again, in embodiments in which each location assembly knows its location and the locations of other assemblies by virtue of GPS information being communicated between the assemblies or by other means (e.g., manual location entry by an installer), the locations of the assemblies may be used in the computation of wall locations to ferret out false indications of wall locations arising from reflections from intervening objects. Yet again, it may be assumed, for the same purpose that each receiver is more or less at the same distance from its closest wall as the opposite receiver.

A combination of manual and automatic mapping may be used. For instance, a user may be presented with a UI such as those described above to indicate the locations of the walls of the enclosure, with subsequent reflections determined to have come from the walls based on the known locations of the LED assemblies being ignored and other reflections being inferred to be from intervening objects such as listeners or audio speakers. Similarly, the user may use a touch display to touch a presentation of an estimated model of the enclosure to indicate where audio speakers and/or listeners are, with reflections from those locations being ignored by the LED assemblies and other reflections inferred to be from the walls, thereby refining the map of the enclosure.

Note that when mapping, reflections indicating locations in the same flat plane, potentially satisfying a size criteria that discriminates between larger walls and smaller rectangular objects, may be mapped as walls of the enclosure. That is, feature recognition may be used to recognize that a series of reflections at a given receiver or receivers all lie in the same plane, and that the plane is sufficiently large to be inferred to be a wall. In addition, or alternatively, the feature recognition may be based on the type of reflection received. For example, it may be assumed that a strong reflection (higher amplitude) comes from a hard speaker surface, whereas a less strong reflection comes from a matte-painted wall. Other feature vectors may be used. Return signal characteristics may be, as discussed above, an exceptionally high amplitude as may be reflected by reflectors or tags engaged with the audio speakers. In contrast other points of reflection with a second type of return signal characteristic may be mapped as human listener locations. The second type of return signal characteristic may be a relatively low amplitude reflection signal as may be produced by a surface such as human skin that is softer than an audio speaker or a wall.

Figure 8:
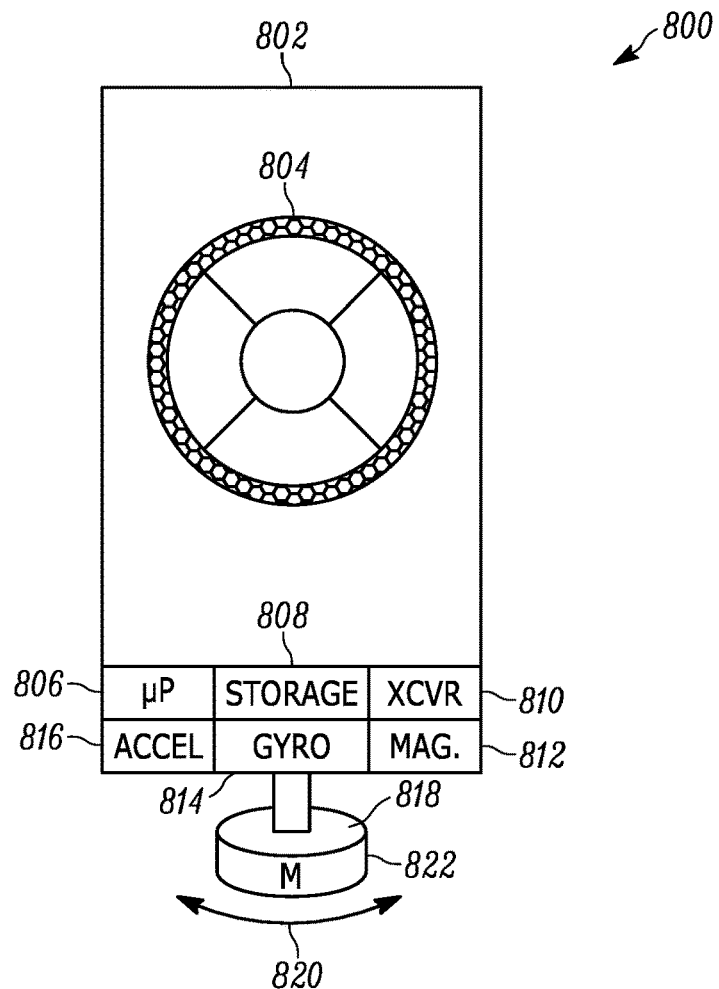
FIG. 8 is a block diagram of a speaker assembly.

FIG. 8 illustrates an example speaker assembly 800 that includes a hollow speaker housing 802 supporting one or more audio speakers 804. The assembly 800 typically includes computing components including one or more processors 806, storage media 808, and transceivers 810 such as Wi-Fi or other transmitted described herein.

The housing 802 of the assembly 800 may also include one or more magnetometers 812 for sensing the Earth's magnetic field and in particular the magnetic north (or south) pole. The assembly 800 can also include one or more gyroscopes 814 and one or more accelerometers 816. The signals from these sensors may be provided to the processor 806 for transmission to other components described herein using the transceiver 810. The accelerometer, gyroscope, and magnetometer can be oriented during assembly such that the front of the speaker housing 802 is the default direction to which all measurements are relative. In this way, the signal from the magnetometer indicates the direction of the magnetic pole and can be fused with the signals from the accelerometer and gyroscope to indicate the azimuth (angle α in FIG. 10) and elevation (angle β in FIG. 11) of the front of the speaker housing, typically taken to define the sonic axis of the speaker 804, relative to the magnetic pole. The front of the speaker may be the ideal location. However, the sensors can be located anywhere within the cabinet. But the reference point must be the front of the speaker.

As also shown, the speaker housing 802 may be rotatably mounted on a shaft 818 for rotation of the housing 802 in the azimuthal (horizontal) plane as indicated by the arrows 820. The rotation may be effected by hand or by a motor 822 controlled by the processor 806.

Figure 9:
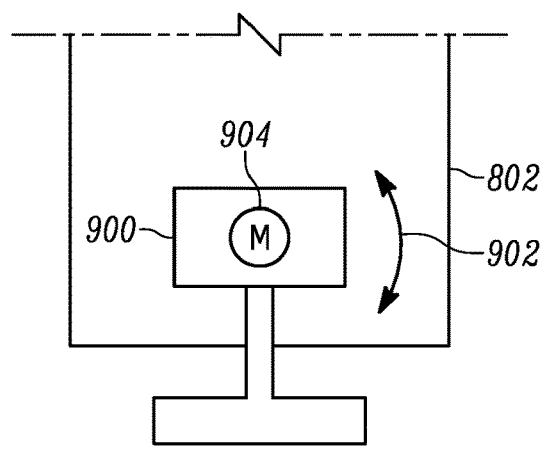
FIG. 9 shows a part of the rear of the assembly shown in FIG. 8.

As shown in FIG. 9, in example embodiments the speaker housing 802 also may be rotatably mounted on a bar 900 for rotation of the housing 802 in the elevational (vertical) plane as indicated by the arrows 902. The rotation may be effected by hand or by a motor 904 controlled by the processor 806.

Figure 10:
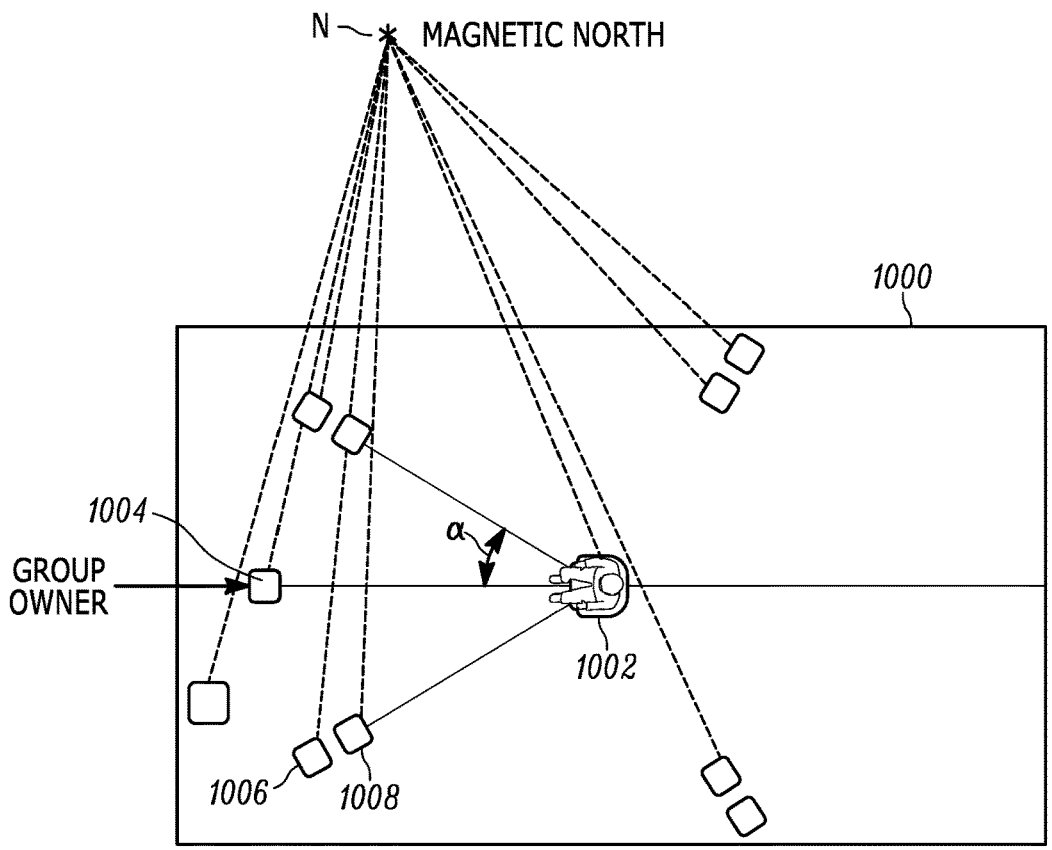
FIGS. 10 and 11 schematically illustrate a speaker layout in a room.
Figure 11:
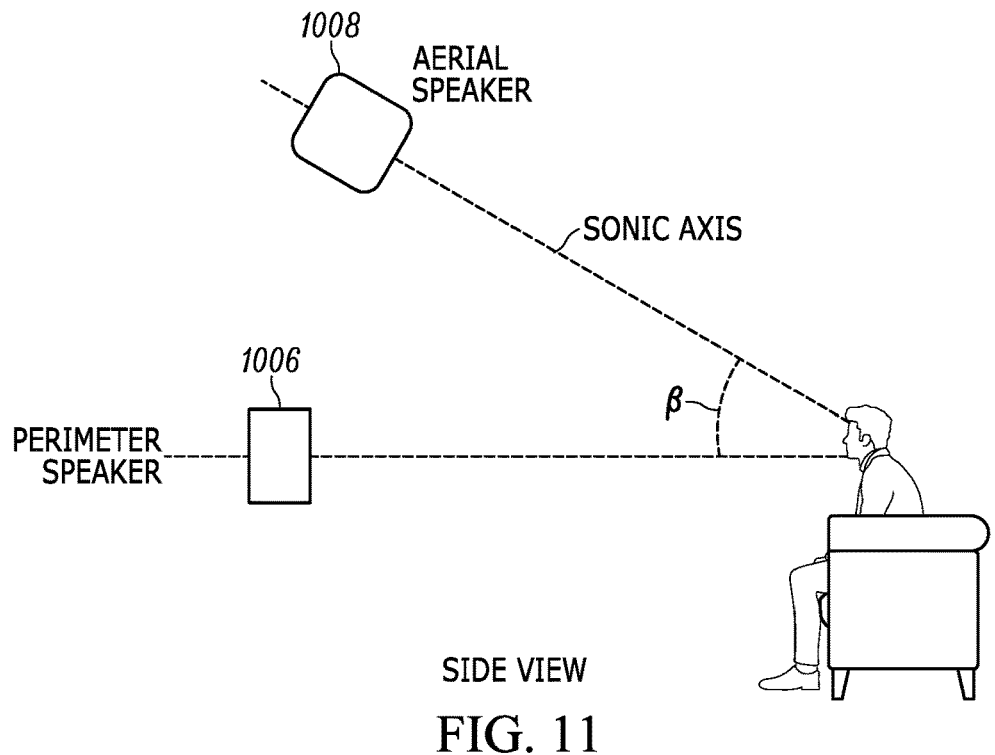

FIG. 10 illustrates a room 1000 with a listener at a location 1002 in the room facing a center channel 1004 which may be established by a group owner including a processor in a speaker assembly or CE device that receives the angular information from the other speakers and controls the speakers to establish their audio configuration settings accordingly. The speaker system in FIG. 10 includes floor-mounted perimeter speaker assemblies 1006 and aerial speakers 1008 that may be mounted above the floor and tilted down toward the listener (at an elevation angle β as shown in FIG. 11). Bottom speakers similarly may be aimed up towards the listener.

Figure 12:
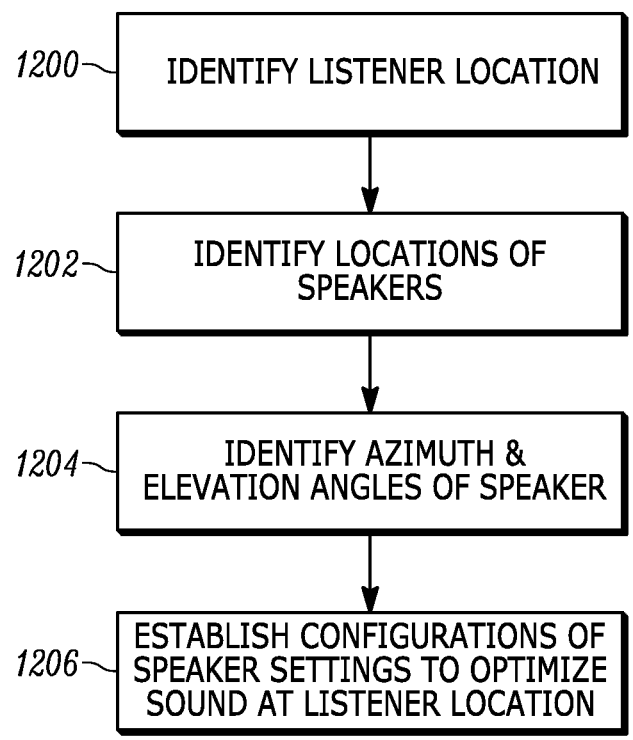
FIGS. 12 and 13 illustrate example logic in example flow chart format consistent with present principles.

All speakers have an azimuth a as shown in FIG. 10 relative to the listener location 1002. FIG. 12 illustrates further.

Commencing at block 1200, the listener location is determined by any of the techniques described herein. In one example embodiment the listener can point a smart device such as the CE device 12 in FIG. 1 towards the center channel or virtual center in the case of no center channel for his/her relative location. That is, where no center channel is present (e.g., stereo), the user aims (as if it was north on a compass) the smart device along an imaginary center line between the two speakers (or where the center channel would normally be). The smart device can include compass functionality such as a magnetometer to report its information to the group owner so that the orientation between the group owner and the smart device (and hence listener location) is known. In the case of stereo, the group owner can be the smart device.

Moving to block 1202, the locations of the speaker assemblies are determined according to principles described herein. Also, at block 1204 the azimuth and elevation angles of the speaker assemblies are determined. This may be done by the group owner by receiving the angular information from each assembly, which recall indicates the azimuth and elevation of the speaker sonic axis relative to the magnetic pole, and transforming the angular information to respective azimuths and elevation angles of the speaker assemblies relative to the listener location. This is facilitated because as disclosed herein the location of the listener is known relative to all of the other speakers in the system.

Then, at block 1206 the audio configuration settings of each speaker in the system is established to optimize sound at the listener location, given the azimuth and elevation information of the sonic axes of the speakers relative to the listener location.

Figure 13:
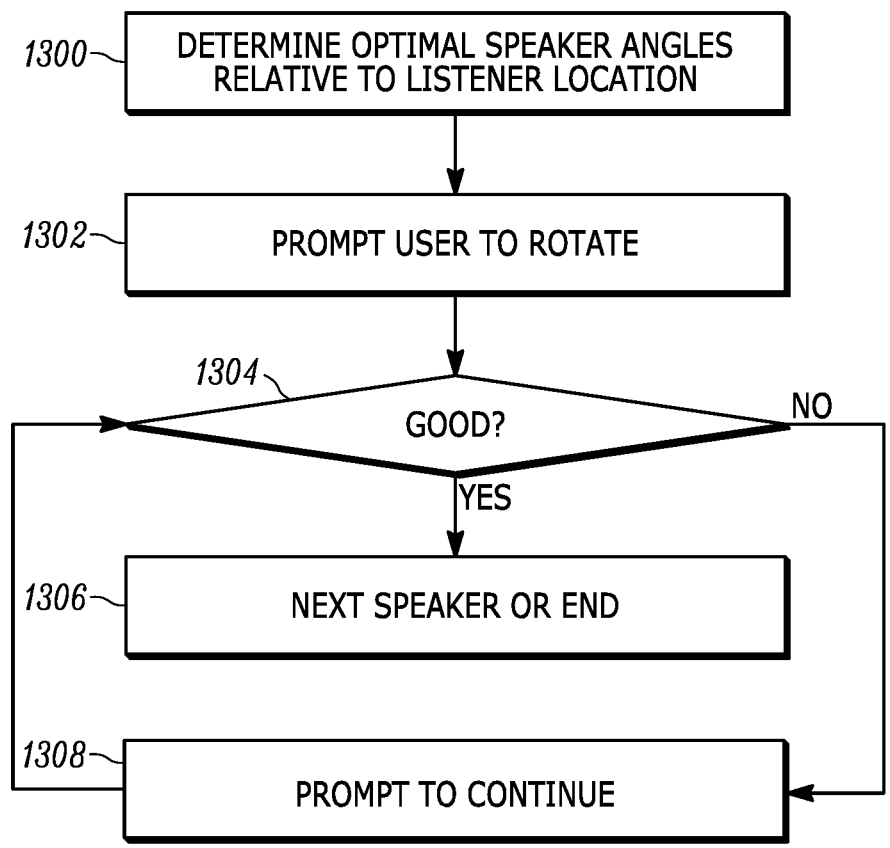

FIG. 13 illustrates additional logic. Commencing at block 1300 the optimal speaker angles given current audio configuration settings of the speakers may be determined relative to the location of the listener. Principles discussed above related to determining sound propagation, reflection, and interference may be used. Assuming that, for a given speaker, the speaker is not oriented optimally, a prompt may be presented to the user (e.g., on the CE device 12) at block 1302 to rotate the speaker. Once the user rotates the speaker it is determined at decision diamond 1304 based on updated signals from the motion sensors of the speaker whether the new orientation of the speaker is acceptable. If it is, the process ends (or the next speaker is analyzed) at state 1306. Otherwise, an updated prompt may be presented to the user at block 1308.

Figure 14:
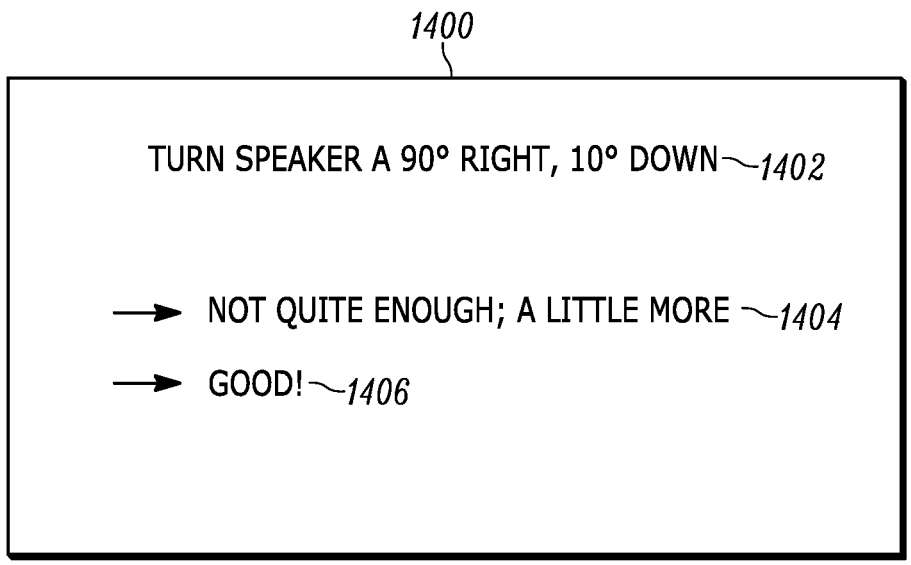
FIG. 14 illustrates an example user interface (UI) consistent with present principles.

FIG. 14 illustrates further. A display 1400 such as any display herein may present a prompt 1402 to rotate a particular by a particular amount in a particular direction, in the example shown, to the right ninety degrees. If the user complies but not quite correctly enough, a renewed prompt may be presented at 1404 to continue adjusting the azimuth and/or elevation angle of the speaker. When the user has correctly oriented the speaker a prompt to that effect may be presented as indicated at 1406.

It should be noted that alternative to prompting the user to rotate the speakers, in embodiments in which the speaker housings are rotated by motors the group owner can transmit a command to the speaker processor to actuate the motor(s) to orient the speaker housing in the optimum azimuthal and elevational directions.

Thus, audio speaker angular determination is made using sensor fusion technology involving an accelerometer, gyroscope, and magnetometer (compass). All speakers in an audio system use their magnetometers to determine their orientation relative to magnetic north. A group owner (typically the center channel or sound bar) gathers the orientation information from all speakers in the system. The group owner determines the angle of orientation of all speakers relative to its own orientation. Changes in angular orientation are sensed by the gyroscopes. For example, during calibration, the user can be told to rotate a certain speaker in the system, and the gyroscope measures the change and reports to the group owner. An indication is presented as to whether the new angle is good, or more is required. The gyroscope in combination with the accelerometer senses changes of angular orientation to aim height speakers downward towards the listening position or bottom speakers upward.

While particular techniques are herein shown and described in detail, it is to be understood that the subject matter which is encompassed by the present invention is limited only by the claims.

What is claimed is:

1. A device comprising:
at least one processor configured with instructions to:
receive, from at least one orientation sensor on a speaker, at least one signal;
determine a location of at least one listener;
determine a location of the speaker;
derive, from the signal, azimuth and elevation angular information of a sonic axis of the speaker relative to the Earth's magnetic pole;
transform the azimuth and elevation angular information relative to the Earth's magnetic pole to respective azimuths and elevation angles of the speaker relative to the location of at least one listener;
based at least in part on the respective azimuths and elevation angles of the speaker relative to the location of the at least one listener, retrieve at least one speaker configuration setting; and
establish a first value of at least a first audio setting of the speaker based on the at least one speaker configuration setting.

2. The device of claim 1, comprising the speaker.

3. The device of claim 1, wherein the first audio setting comprises a speaker system channel configuration.

4. The device of claim 1, wherein the first audio setting comprises a compression setting.

5. The device of claim 1, wherein the first audio setting comprises ambient sound attenuation.

6. The device of claim 1, wherein the first audio setting comprises extra bass.

7. The device of claim 1, wherein the first audio setting comprises equalization (EQ).

8. The device of claim 1, wherein the at least one orientation sensor comprises a magnetometer, an accelerometer, and a gyroscope.

9. A method, comprising:
receiving a signal from at least one sensor on a housing of a speaker representing an angular orientation of the speaker;
determining a location of at least one listener;
determining a location of the speaker;
deriving azimuth and elevation angular information of a sonic axis of the speaker relative to the Earth's magnetic pole from the signal;
transforming the azimuth and elevation angular information of a sonic axis of the speaker relative to the Earth's magnetic pole to respective azimuths and elevation angles of the speaker relative to the location of the at least one listener; and
establishing at least one speaker configuration of the speaker based at least in part on the respective azimuths and elevation angles of the speaker relative to the location of the at least one listener.

10. The method of claim 9, wherein the at least one sensor comprises a magnetometer, an accelerometer, and a gyroscope.

11. The method of claim 9, comprising:
presenting a human-perceptible prompt to rotate the housing.

12. The method of claim 9, comprising:
using a magnetometer to determine an orientation of the housing relative to magnetic north.

13. The method of claim 9, comprising determining an orientation of the housing relative to a location of a listener.

14. The method of claim 9, comprising identifying changes in the angular orientation of the housing using at least one gyroscope.

15. The method of claim 9, comprising fusing a signal from a gyroscope with a signal from an accelerometer to sense changes of the angular orientation of the housing.

16. An audio speaker system, comprising:
at least a first audio speaker associated with a first speaker driver; and
at least one processor configured with instructions for:
establishing a first audio configuration of the first audio speaker responsive to a first signal from a motion sensor mounted on a surface of a housing of the first audio speaker at least in part by:
determining a location of at least one listener;
with at least azimuth angular information of a sonic axis of the first audio speaker relative to the Earth's magnetic pole being derived from the first signal;
transforming at least the azimuth angular information to a respective azimuth angle of the first audio speaker relative to the location of the at least one listener; and
establishing at least the first audio configuration of the first audio speaker based at least in part on the respective azimuth angle of the first audio speaker relative to the location of the at least one listener.

17. The system of claim 16, wherein the motion sensor comprises at least one accelerometer.

18. The system of claim 16, wherein the motion sensor comprises at least one gyroscope.

19. The system of claim 16, comprising at least one magnetometer to sense a magnetic pole to determine an orientation of the housing.

* * * * *